(No Model.)

A. G. AVERY.
VEHICLE SEAT.

No. 566,836.        Patented Sept. 1, 1896.

Witnesses.
Joseph Post
Mabel H. Jones.

Inventor.
Albert G. Avery.
By Ethiel J. Cilley
Attorney.

UNITED STATES PATENT OFFICE.

ALBERT G. AVERY, OF GRAND RAPIDS, MICHIGAN.

VEHICLE-SEAT.

SPECIFICATION forming part of Letters Patent No. 566,836, dated September 1, 1896.

Application filed May 8, 1896. Serial No. 590,775. (No model.)

*To all whom it may concern:*

Be it known that I, ALBERT G. AVERY, a citizen of the United States, residing at Grand Rapids, in the county of Kent and State of Michigan, have invented certain new and useful Improvements in Vehicle-Seats, of which the following is a specification.

My invention relates to improvements in auxiliary seats for use in buggies, cutters, &c.; and its objects are, first, to provide an auxiliary seat with which the occupant will have sufficient room for the free action of the feet without too close contact with the dashboard of the vehicle; second, to provide an auxiliary seat that may be readily placed in position on the seat of the vehicle in such a position that the weight of the occupants of said seat will hold it firmly to place, and the auxiliary seat may be readily removed, replaced, or folded and stored away, and, third, to provide an auxiliary seat for vehicles with which the occupant, though sitting directly over the laps of the occupants of the vehicle-seat, will not inconvenience them. I attain these objects by the mechanism illustrated in the accompanying drawings, in which—

Figure 1:
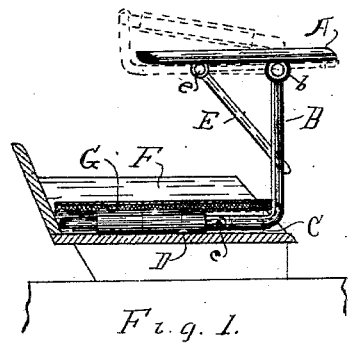
Figure 4:
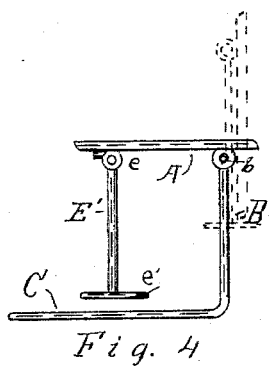
Figure 2:
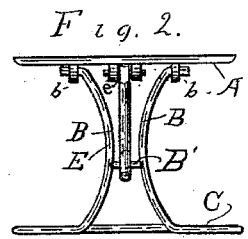
Figure 5:
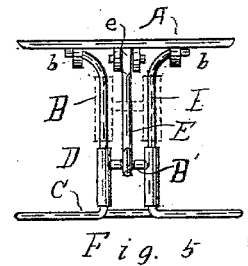
Figure 7:
Figure 3:
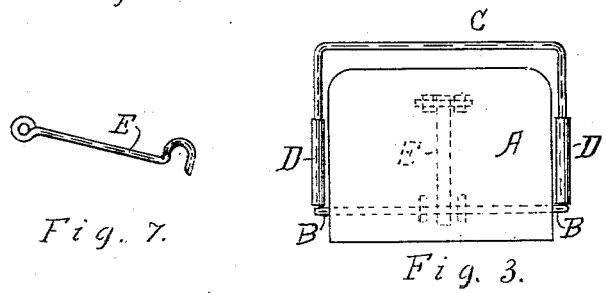
Figure 6:

Figure 1 is a side elevation of my seat shown in position on a vehicle-seat, here shown in section. Fig. 2 is a front elevation of the auxiliary seat. Fig. 3 is a plan of the same. Fig. 4 shows a modified form of the support of the seat. Fig. 5 is a front elevation of the seat, representing the standards pivoted to fold in lieu of the base. Fig. 6 is the same folded to store away, and Fig. 7 is a side view of the brace.

Similar letters refer to similar parts throughout the several views.

In constructing my auxiliary seat I pivot the seat A upon the standard B, the lower end of which is bent back to form the base C, which is designed to pass under the cushion of the seat F, as indicated in Fig. 1, so that the weight of the occupants of the seat will be brought to bear upon the base through the cushion. I prefer that the standards be curved together, as in Fig. 1, so that there will be no inconvenience to the occupants on each side and so that they can sit close together and the seat A will project over the lap of each.

I support the seat by means of a brace E, secured to the back of the seat and fitted to engage with the cross-rod B′, that connects the standards. I prefer that the standards be pivoted to the seat, as at *b*, and the brace be pivoted, as at *e*, so that they may be folded to store the seat away, and in order to reduce the space occupied by it when stored I cut the base C in two and pivot it, as at *c*, so that the whole may be folded together, as indicated by the dotted lines in Fig. 1. The same results may be attained by cutting and pivoting the standards, as indicated in Figs. 5 and 6.

To strengthen the pivoted point in the base or standards, as the case may be, I provide slides D of tube of a proper size to fit freely over the one or the other, as shown in Fig. 1, where it is slid from over the joint, and Figs. 3 and 5, where it is represented as over the joint.

The brace E may, if desired, be replaced with a standard E′, as shown in Fig. 4, provided with a foot *e′*, that is designed to rest on top of the cushion, in which case there must be sufficient distance between the feet and the base C to admit the thickness of the cushion G. When the standards are divided, I find it better to place the cross-rod B′ between the slides B, so that the brace E will connect as low down as possible.

The pivoting of the seat to the standard at *b* enables me, if desired, to throw the seat over, as indicated by the dotted lines in Fig. 4, so that occupants may easily leave the seat of the vehicle.

Having thus fully described my invention, what I claim as new, and desire to secure by Letters Patent of the United States, is—

1. In an auxiliary seat for vehicles, a skeleton base fitted to pass under the cushion of the seat and bent to form two standards at the front edge of the main seat, said standards connected by a cross-bar near their centers and pivoted at their upper ends to the front edge of the auxiliary seat, and a brace pivoted at one end of the back edge of the auxiliary seat and fitted to engage at the other end with the cross-bar on the standards, substantially as and for the purpose set forth.

2. In an auxiliary seat for vehicles, a seat pivoted to a standard, a brace pivoted to the seat to engage the standard, a base turned from the standard to pass under the seat-cushion, pivot-joints to facilitate folding the standard and base close to the seat for storing, and slides for sliding over and supporting said joints, substantially as and for the purpose set forth.

Signed at Grand Rapids, Michigan, May 5, 1896.

ALBERT G. AVERY.

In presence of—
MABEL W. JONES,
ITHIEL J. CILLEY.